United States Patent
Cociglio (10) Patent No.: US 9,762,464 B2
(45) Date of Patent: Sep. 12, 2017

(54) MEASUREMENT ON DATA TRAFFIC IN A COMMUNICATION NETWORK

(75) Inventor: Mauro Cociglio, Torino (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 14/235,276

(22) PCT Filed: Jul. 28, 2011

(86) PCT No.: PCT/EP2011/063010
§ 371 (c)(1),
(2), (4) Date: Jan. 27, 2014

(87) PCT Pub. No.: WO2013/013720
PCT Pub. Date: Jan. 31, 2013

(65) Prior Publication Data
US 2014/0160975 A1    Jun. 12, 2014

(51) Int. Cl.
*H04L 12/26* (2006.01)
*H04L 12/801* (2013.01)

(52) U.S. Cl.
CPC .......... *H04L 43/08* (2013.01); *H04L 43/0829* (2013.01); *H04L 43/106* (2013.01); *H04L 47/10* (2013.01)

(58) Field of Classification Search
CPC ...................................................... H04L 43/08
See application file for complete search history.

(56) References Cited

U.S. PATENT DOCUMENTS

| | | |
|---|---|---|
| 6,188,674 B1 * | 2/2001 | Chen et al. ............. 370/252 |
| 6,747,972 B1 | 6/2004 | Lenoski et al. |
| 2011/0255440 A1 | 10/2011 | Cociglio et al. |

FOREIGN PATENT DOCUMENTS

| | | |
|---|---|---|
| WO | WO 2010/072251 A1 | 7/2010 |
| WO | WO 2011/079857 A1 | 7/2011 |

OTHER PUBLICATIONS

International Search Report issued Nov. 4, 2011 in PCT/EP2011/063010.

* cited by examiner

*Primary Examiner* — Hassan Kizou
*Assistant Examiner* — Ashil Farahmand
(74) *Attorney, Agent, or Firm* — Oblon, McClelland, Maier & Neustadt, L.L.P.

(57) ABSTRACT

A method for performing a measurement on data traffic at a node of a communication network. The node includes an input interface and an output interface. The input interface receives first packets and checks whether they are marked. If a first packet is marked, a global input parameter is updated. A partial input parameter is also updated, provided the first packet is addressed to the output interface. The output interface receives second packets, which include at least part of the first packets, and checks whether they are marked. If a second packet is marked, a partial output parameter is updated, provided the second packet is received from the input interface. Further, a global output parameter is updated. The method further performs a measurement on the data traffic based on: global input parameter, partial input parameter, global output parameter, and partial output parameter.

19 Claims, 6 Drawing Sheets

MEASUREMENT ON DATA TRAFFIC IN A COMMUNICATION NETWORK

TECHNICAL FIELD

The present invention relates to the field of communication networks. In particular, the present invention relates to a method for performing a measurement, in particular a data loss measurement and/or a time measurement (in particular, a measurement of delay and/or interarrival jitter), on data traffic transmitted in a communication network. Further, the present invention relates to a node of a communication network implementing such a method.

BACKGROUND ART

In a packet-switched communication network, data are transmitted in the form of packets which are routed from a source node to a destination node through possible intermediate nodes. Exemplary packet-switched networks are Ethernet networks, IP networks and MPLS networks.

On the other hand, in circuit-switched networks data are transmitted in the form of continuous bit flows carried from the source node to the destination node within plesiochronous or synchronous frames. Exemplary circuit-switched networks are PDH, SDH, Sonet and OTN networks.

Herein after, the expression "data unit" will designate a portion of a data flow transmitted in a communication network. In particular, in case of a packet-switched network, a data unit may be a packet or a portion of a packet. Besides, in case of a circuit-switched network, a data unit may be a plesiochronous frame, a portion of a plesiochronous frame, a synchronous frame or a portion of a synchronous frame.

Data transmitted either in a packet-switched network or in a circuit-switched network from a source node not always reach the destination node, i.e. they may be lost during transmission through the network.

Loss of data may be due to different reasons. For instance, a node or a link may fail, thereby causing a total data loss until the failure is either bypassed or fixed. Alternatively, in a packet-switched network, data within a packet may be discarded by an intermediate node due to a congestion of its ports. Besides, both in packet-switched networks and in circuit-switched networks, data may be discarded by an intermediate node or by the destination node, since they contain bit errors.

When providing a service by transmitting data through a packet-switched network or a circuit-switched network, the rate of data lost during transmission affects the quality of service (QoS) of that service.

Besides, a data unit is transmitted at a transmission time by the source node and is received at a reception time by the destination node. The time elapsing between transmission time and reception time is typically called "one way delay" (or, briefly, "delay"). The delay of a data unit is given by the following equation:

$$D(i)=Ri-Si,\quad [1]$$

where Si is the transmission time and Ri is the reception time of the data unit.

The delay of a data unit mainly depends on the number of possible intermediate nodes crossed by the data unit from source to destination, on the permanence time of the data unit at the source node and at each possible intermediate node (mainly within the buffers of such nodes) and on the propagation time along the links (which is turn depends on the length of the links and their capacity). In packet-switched networks, where data units are routed hop-by-hop by each node, both the number of possible intermediate nodes crossed by data units and the permanence time of data units at each node are unpredictable. Accordingly, the delay of a data unit is almost unpredictable.

Besides, data units of a same data flow may have different delays. In a packet-switched communication network, the difference in the delays of two data units (i.e. packets) of a same data flow is termed "interarrival jitter". In particular, if Si and Sj are the transmission times for a first packet i and a second packet j, and Ri and Rj are the reception times for the first packet i and the second packet j, the interarrival jitter may be expressed as:

$$J(i,j)=(Rj-Ri)-(Sj-Si).\quad [2]$$

When a communication service (in particular, a real-time voice or data service such as calls, conference calls, video conferences, etc.) is provided by means of a communication network, the delay and interarrival jitter of the data flows carrying the service strongly affect the quality of service (QoS) perceived by the end users of the service.

Therefore, measuring the data loss and delay/interarrival jitter of the data flows carrying services is of particular interest for network operators.

WO 2010/072251 (in the name of the same Applicant) discloses a method for measuring data loss of a data flow transmitted through a communication network from a transmitting node to a receiving node. Before transmitting the data units of the data flow, the transmitting node marks each data unit for dividing the data flow in blocks. In particular, the transmitting node marks each data unit by setting a bit of its header to "1" or "0". The marking results in a sequence of blocks, where blocks of data units marked with "1" alternate in time with blocks of data units marked with "0". The blocks may have a same duration termed "block period" Tb (e.g. 5 minutes). Further, while marking the data units, the transmitting node increases by one a first counter C1 each time a data unit is marked by "1", and a second counter C0 each time a data unit is marked by "0". The marked data units are then received at the receiving node. Each time the receiver node receives a data unit, it checks its marking, increases a third counter C'1 if the marking is "1" and increases a fourth counter C'0 if the marking is "0".

According to WO 2010/072251, while the transmitting and receiving nodes are operating as described above, a management server cooperating with the transmitting and receiving nodes periodically detects the values of the counters C1, C0, C'1 and C'0, and uses them for calculating the data loss.

PCT/EP2009/067991 (in the name of the same Applicant) discloses a method for performing a time measurement (in particular, measuring delay and/or interarrival jitter) on a data flow transmitted from a transmitting node to a receiving node of a communication network.

SUMMARY OF THE INVENTION

The solution described by WO 2010/072251 is suitable for performing measurements on a given data flow, provided that each involved node (i.e. the transmitting and receiving nodes in case of end-to-end measurements, but also the intermediate nodes when a measurement per each single span of the end-to-end path is needed) is capable of identifying the data flow. In other words, each involved node should be capable of distinguishing the data units belonging to that data flow among all the received data units, before deciding whether to increase the proper counter.

However, the Applicant has perceived that, in some applications involving transmission of several data flows across the network, it may be useful providing measurements indicative of the behaviour of nodes and links of the network on the data flows as a whole, without making distinctions between the single data flows.

In view of the above, the Applicant has tackled the problem of providing a method for performing a measurement on data traffic transmitted in a communication network, which is capable of providing a measurement on a data flow without the need to identify the data flow, i.e. without the need to distinguish the data units belonging to that data flow among all the data units transmitted in the communication network.

In the following description and in the claims, the expression "performing a measurement" will designate an operation of measuring data loss and/or an operation of performing a time measurement.

Further, in the following description and in the claims, the expression "measuring data loss" will designate an operation of measuring a difference between a number of data units detected at a first interface and a number of data units detected at a second interface, this difference corresponding to the number of data units lost in transmission from the first interface to the second interface.

Further, in the following description and in the claims, the expression "performing a time measurement" will designate an operation of measuring:
  a delay induced on a data unit by transmission from the first interface to the second interface; and/or
  an interarrival jitter induced on a pair of data units by transmission from the first interface to the second interface.

The first interface and the second interface may be interfaces of a same node. For instance, the first interface may be the input interface of a first port of a node and the second interface may be the output interface of a second port of the same node. In this case, the measurement will be termed "node measurement".

The first interface and the second interface may be interfaces of different nodes. For instance, the first interface may be the output interface of a port of a first node, and the second interface may be the input interface of a port of a second node connected to the first node by means of a link terminated at its opposite ends by the first and second interfaces. In this case, the measurement will be termed "link measurement".

Besides, in the following description and in the claims, the expression "marking a data unit" will designate an operation of setting a feature of the data unit to a predefined value. For instance, the operation of marking a data unit may comprise the operation of setting one or more bits of the data unit (e.g. one bit or a bit sequence of its header) to a predefined value, the operation of setting its frequency or its phase to a predefined value, and so on.

According to a first aspect, the present invention provides a method for performing a measurement on data traffic at a node of a communication network, the node comprising at least an input interface and an output interface,
the method comprising, at the input interface, receiving first data units and:
a) for each received first data unit, checking whether the first data unit is marked by a feature set to any value selected from a first value and a second value;
b) if the first data unit is marked, updating a global input parameter when the feature is set to the first value; and
c) updating a partial input parameter when the feature is set to the first value and when the first data unit is addressed to the output interface,
the method further comprising, at the output interface, receiving second data units, the second data units comprising at least part of the first data units, and:
d) for each received second data unit, checking whether the second data unit is marked by the feature set to any value selected from the first value and the second value;
e) if the second data unit is marked, updating a partial output parameter when the feature is set to the first value and when the second data unit is received from the input interface; and
f) updating a global output parameter when the feature is set to the first value,
the method further comprising:
g) performing a measurement on the data traffic based on at least one of: the global input parameter, the partial input parameter, the global output parameter and the partial output parameter.

A global input parameter may include a global input counter or an input timestamp associated to the global input counter; a global output parameter may include a global output counter or an output timestamp associated to the global output counter; a partial input parameter may include a partial input counter or an input timestamp associated to the partial input counter; a partial output parameter may include a partial output counter or an output timestamp associated to the partial output counter.

According to first embodiments:
  at step b), updating comprises increasing a global input counter upon reception of each first data unit having the feature set to the first value;
  at step c), updating comprises increasing a partial input counter upon reception of each first data unit having the feature set to the first value and being addressed to the output interface;
  at step e), updating comprises increasing a partial output counter upon reception of each second data unit having the feature set to the first value and being received from the input interface;
  at step f), updating comprises increasing a global output counter upon reception of each second data unit having the feature set to the first value; and
  at step g), performing a measurement comprises calculating a data loss based on at least one of: the global input counter, the partial input counter, the global output counter and the partial output counter.

According to particularly advantageous variants:
  at step b), updating comprises setting a global input timestamp equal to a current time upon reception of a predetermined first data unit having the feature set to the first value;
  at step c), updating comprises setting a partial input timestamp equal to the current time upon reception of the predetermined first data unit, if the predetermined first data unit is addressed to the output interface;
  at step e), updating comprises setting a partial output timestamp equal to the current time upon reception of a predetermined second data unit having the feature set to the first value, if the predetermined second data unit is received from the input interface (Iin1);
  at step f), updating comprises setting a global output timestamp equal to the current time upon reception of the predetermined second data unit; and
  at step g), performing a measurement comprises performing a time measurement based on at least one of: the global input timestamp, the partial input timestamp, the global output timestamp and the partial output timestamp.

A global input timestamp is an input timestamp associated to the global input counter; a global output timestamp is an output timestamp associated to the global output counter; a partial input timestamp is an input timestamp associated to the partial input counter; a partial output timestamp is an output timestamp associated to the partial output counter.

At step g), the performing a time measurement may comprise measuring at least one of a delay and an interarrival jitter of the data traffic.

Preferably:
- at step b), updating further comprises setting a further global input timestamp equal to a time upon which a further predetermined first data unit temporally adjacent to the predetermined first data unit has been received;
- at step c), updating further comprises setting a further partial input timestamp equal the time upon which the further predetermined first data unit has been received;
- at step e), updating further comprises setting a further partial output timestamp equal to a time upon which a further predetermined second data unit temporally adjacent to the predetermined second data unit has been received;
- at step f), updating further comprises setting a further global output timestamp equal the time upon which the further predetermined second data unit has been received; and
- at step g), performing a time measurement comprises measuring an interarrival jitter as a difference between:
  - one of: the global input timestamp, the partial input timestamp, the global output timestamp and the partial output timestamp, respectively; and
  - one of: the further global input timestamp, the further partial input timestamp, the further global output timestamp and the further partial output timestamp, respectively.

Preferably, at step g), performing a measurement comprises performing a measurement relating to the data traffic within the node based on the partial input parameter and the partial output parameter.

Alternatively, at step g), performing a measurement comprises performing a measurement relating to the data traffic on a first link between the node and a first further node transmitting the first data units to the node based on the global input parameter and a further global output parameter generated by the first further node.

Alternatively, at step g), performing a measurement comprises performing a measurement relating to the data traffic on a second link between the node and a second further node receiving the second packets from the node based on the global output parameter (Y2(1)) and a further global input parameter generated by the second further node.

According to preferred embodiments, the method further comprises, if at step a) it is determined that the first data unit is not marked, marking the first data unit by setting the feature to the first value before performing step c).

According to preferred embodiments, the method further comprises, if at step d) it is determined that the second data unit is not marked, marking the second data unit by setting the feature to the first value before performing step f).

Preferably, step g) is performed by a management server cooperating with the node. Alternatively, step g) is performed by the node.

According to a second aspect, the present invention provides a node for a communication network, the node comprising at least an input interface and an output interface, wherein the input interface is configured to receive first data units and:
a) for each received first data unit, check whether the first data unit is marked by a feature set to any value selected from a first value and a second value;
b) if the first data unit is marked, update a global input parameter when the feature is set to the first value; and
c) update a partial input parameter when the feature is set to the first value and when the first data unit is addressed to the output interface, and wherein the output interface is configured to receive second data units, the second data units comprising at least part of the first data units, and:
d) for each received second data unit, check whether the second data unit is marked by the feature set to any value selected from the first value and the second value;
e) if the second data unit is marked, update a partial output parameter when the feature is set to the first value and when the second data unit is received from the input interface; and
f) update the global output parameter when the feature is set to the first value, the node being further configured to provide the global input parameter, the partial input parameter, the global output parameter and the partial output parameter for performing a measurement on the data traffic.

Preferably, the node is further configured to perform a measurement on the data traffic based on at least one of: the global input parameter, the partial input parameter, the global output parameter and the partial output parameter.

According to a third aspect, the present invention provides a management server for a communication network, the management server being configured to cooperated with the node as set forth above, the management server being configured to perform a measurement on the data traffic based on at least one of: the global input parameter, the partial input parameter, the global output parameter and the partial output parameter.

According to a fourth aspect, the present invention provides a computer program product, loadable in the memory of at least one computer and including software code portions for performing the steps of the method set forth above when the product is run on a computer.

According to a fifth aspect, the present invention provides a method for receiving data traffic at a node of a communication network, the node comprising at least an input interface and an output interface, the method for receiving comprising the method for performing a measurement on data traffic as set forth above.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Herein after, the method according to a first preferred embodiment of the present invention will be described in detail, by referring to the particular exemplary case of measuring data loss in a packet-switched network.

Figure 1:
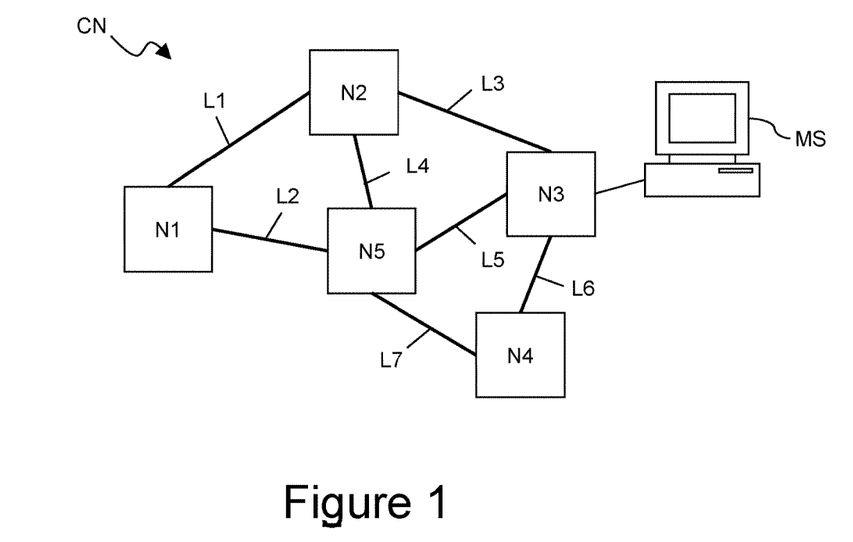
FIG. 1 schematically shows an exemplary packet-switched network.

FIG. 1 schematically shows an exemplary packet-switched communication network CN comprising five nodes N1, N2, . . . N5. The communication network CN may be for instance an Ethernet network, an Internet network, or any other type of packet-switched communication network. The nodes N1, N2, . . . N5 are connected each other according to a partially meshed topology, by means of physical links L1, L2, . . . , L7. The number of nodes and the topology of the communication network CN shown in FIG. 1 are merely exemplary.

The communication network CN is suitable for cooperating with a management server MS. In FIG. 1, the management server MS is connected to the node N3. This is merely exemplary, since the management server MS may be connected to the communication network CN through any of its nodes N1, N2, . . . , N5. Alternatively, the management server MS may be integrated in any of the nodes N1, N2, . . . , N5 of the communication network CN.

Figure 2:
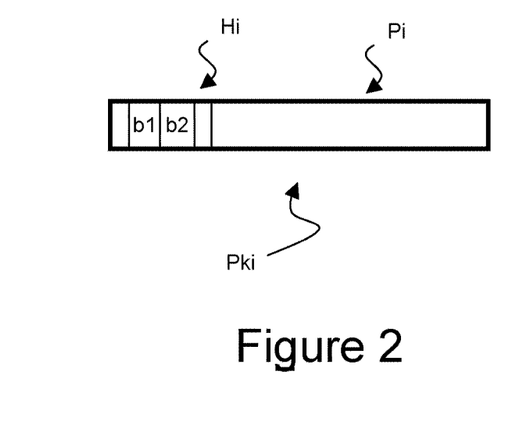
FIG. 2 schematically shows a packet's structure, according to an embodiment of the present invention.

The nodes N1, N2, . . . , N5 of the communication network CN are configured for exchanging each other data traffic in the form of packets Pki along the links L1, L2, . . . , L7. As shown in FIG. 2, each packet Pki comprises a header Hi and a payload Pi. The payload Pi comprises data to be transmitted. Besides, preferably, the header Hi comprises information for routing the packet Pki, such as the source node address and the destination node address.

According to embodiments of the present invention, the packet Pki further comprises at least one marking bit reserved for marking the packet Pki. More preferably, the packet Pki comprises two marking bits:

a first marking bit b1, indicating whether the packet Pki is marked or not. For instance, b1=0 indicates that the packet is not marked, while b1=1 indicates that the packet Pki is marked; and a second marking bit b2, indicating the marking of the packet Pki. b2=0 indicates that the packet Pki is marked by 0, while b2=1 indicates that the packet Pki is marked by 1.

Hence, the packet Pki may be marked or not and, if it is marked, it can have two alternative markings: 0 or 1. The marking bits b1, b2 are preferably used by the nodes of the communication network CN for performing a measurement (in particular, a data loss measurement and/or a time measurement), as it will be described in detail herein after.

The marking bits b1, b2 are preferably comprised in the header Hi of the packet Pki. The marking bits b1, b2 may be for instance two bits to which the protocol according to which the packet Pki is formatted has not assigned a specific function yet. Alternatively, the marking bits b1, b2 may be two bits of a field having other uses, such as for instance two bits of the priority field in IP packets, or two bits of the label field in MPLS packets.

Figure 3:
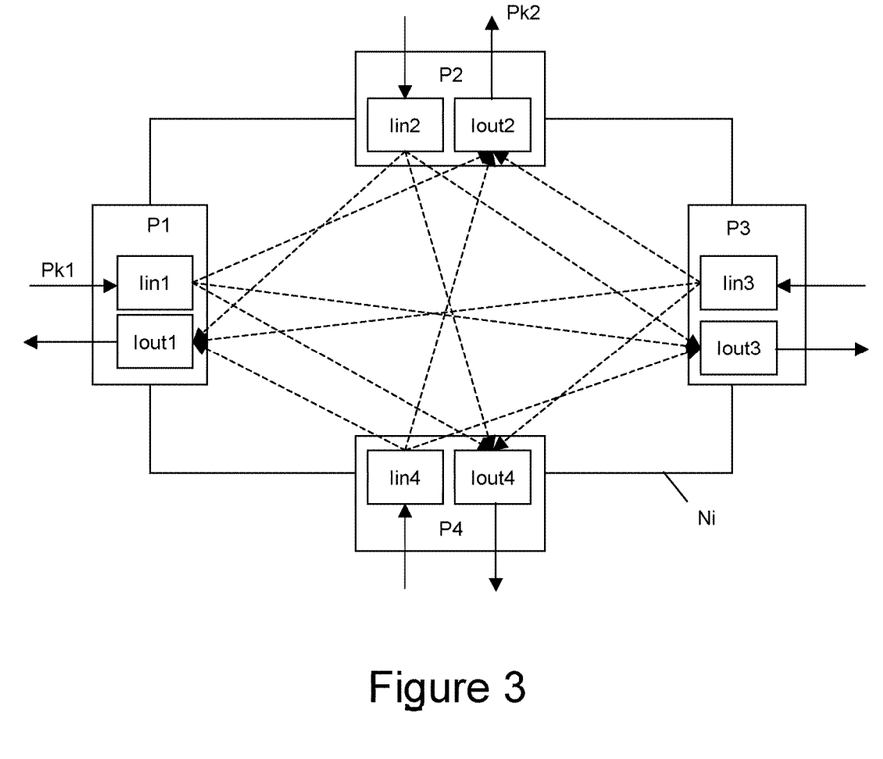
FIG. 3 shows in further detail the structure of a node of the communication network of FIG. 1.

FIG. 3 shows in further detail the structure of a node Ni of the communication network CN, which may be any of the nodes N1, N2, . . . , N5. The node Ni may be for instance an IP router (in case the network CN is an IP network), an Ethernet switch (in case the network CN is an Ethernet network) and so on.

The node Ni comprises a number n of bidirectional ports, each port bidirectionally connecting the node Ni to a port of an adjacent node of the communication network CN by means of a respective link. By way of non limiting example, the node Ni shown in FIG. 3 comprises four ports (n=4), namely P1, P2, P3, P4. Each node N1, N2, . . . , N5 may of course have a different number of ports, depending on the number of adjacent nodes.

Each port P1, P2, P3, P4 preferably comprises an input interface Iin1, Iin2, Iin3, Iin4 suitable for receiving packets from the corresponding adjacent node through the corresponding link and an output interface Iout1, Iout2, Iout3, Iout4 suitable for transmitting packets to the corresponding adjacent node through the corresponding link. Within the node Ni, the input interface of each port is connected to the output interface of the other (n−1) ports, as schematically indicated by the dashed arrows in FIG. 3. In other words, the node Ni is configured so that packets received through the input interface of a port may be transmitted through the output interface of anyone of the other ports.

Each input interface Iin1, Iin2, Iin3, Iin4 preferably implements a couple of global input counters and (n−1) couples of partial input counters. In particular, referring to the exemplary node Ni of FIG. 3:

the input interface Iin1 of the port P1 implements:
a couple of global input counters $X1(1)$, $X1(0)$ and
(n−1)=3 couples of partial input counters $X12(1)$, $X12(0)$; $X13(1)$, $X13(0)$; $X14(1)$, $X14(0)$, the input interface Iin2 of the port P2 implements:
a couple of global input counters $X2(1)$, $X2(0)$ and
(n−1)=3 couples of partial input counters $X21(1)$, $X21(0)$; $X23(1)$, $X23(0)$; $X24(1)$, $X24(0)$;

the input interface Iin3 of the port P3 implements:
a couple of global input counters $X3(1)$, $X3(0)$ and
(n−1)=3 couples of partial input counters $X31(1)$, $X31(0)$; $X32(1)$, $X32(0)$; $X34(1)$, $X34(0)$; and the input interface Iin4 of the port P4 implements:
a couple of global input counters $X4(1)$, $X4(0)$ and
(n−1)=3 couples of partial input counters $X41(1)$, $X41(0)$; $X42(1)$, $X42(0)$; $X43(1)$, $X43(0)$.

Similarly, each output interface Iout1, Iout2, Iout3, Iout4 preferably implements a couple of global output counters and (n−1) couples of partial output counters. In particular, referring to the exemplary node Ni of FIG. 3:

the output interface Iout1 of the port P1 implements:
a couple of global output counters $Y1(1)$, $Y1(0)$ and
(n−1)=3 couples of partial output counters $Y21(1)$, $Y21(0)$; $Y31(1)$, $Y31(0)$; $Y41(1)$, $Y41(0)$, the output interface Iout2 of the port P2 implements:
a couple of global output counters $Y2(1)$, $Y2(0)$ and
(n−1)=3 couples of partial output counters $Y12(1)$, $Y12(0)$; $Y32(1)$, $Y32(0)$; $Y42(1)$, $Y42(0)$;

the output interface Iout3 of the port P3 implements:
a couple of global output counters $Y3(1)$, $Y3(0)$ and
(n−1)=3 couples of partial output counters $Y13(1)$, $Y13(0)$; $Y23(1)$, $Y23(0)$; $Y43(1)$, $Y43(0)$; and the output interface Iout4 of the port P4 implements:
a couple of global output counters Y4(1), Y4(0) and (n−1)=3 couples of partial output counters Y14(1), Y14(0); Y24(1), Y24(0); Y34(1), Y34(0).

As mentioned above, the node Ni exchanges data traffic with the adjacent nodes through the ports P1, P2, P3 and P4. In particular, it receives packets from the adjacent nodes through the input interfaces Iin1, Iin2, Iin3, Iin4, terminates the packets of which it is the destination node and transmits the remaining packets to the adjacent nodes through the output interfaces Iout1, Iout2, Iout3, Iout4. In addition, it generates further packets of which it is the source node and transmits them to the adjacent nodes through the output interfaces Iout1, Iout2, Iout3, Iout4.

The operation of the input interface Iin1 of the port P1 according to a first embodiment of the present invention will be now described in detail with reference to FIG. 4.

The input interface Iin1 receives packets Pk1 from the link which connects it to a node adjacent to the node Ni. The packets Pk1 may belong to different data flows which have different sources and/or destinations and whose paths from source to destination cross at least at the node Ni. Accordingly, the input interface Iin1 distributes the packets PS1 among the output interfaces Iout2, Iout3 and Iout4 of the other ports P2, P2 and P3.

At least some of the packets Pk1 received at the node Ni may be marked by nodes upstream the node Ni. The marked packets Pk1 have their first marking bit equal to "1", while the unmarked packets Pk1 have their first marking bit b1 equal to "0". Furthermore, each marked packet Pk1 may have its second marking bit b2 equal to "1" (indicating that the packet Pk1 is marked by 1) or "0" (indicating that the packet Pk1 is marked by 0). Preferably, all nodes of the communication network CN which are suitable for marking packets (included the node Ni, as it will be described in detail herein after) periodically change the applied marking (1 or 0) with a period Tb, that will be termed herein after "block period". All the nodes of the communication network CN which are suitable for marking packets (included the node Ni) are preferably reciprocally synchronized, so that in each instant they apply the same marking. Herein after, it is assumed that during odd block periods T1, T3, . . . Tk−1 (all having duration Tb) the nodes configured to mark packets apply the marking 1, whereas during even block period T2, T4, . . . Tk the nodes configured to mark packets apply the marking 0. Hence, the packets Pk1 received at the node Ni which are marked during odd block periods T1, T3, . . . Tk−1 are marked by 1, whereas the packets Pk1 received at the node Ni which are marked during even block period T2, T4, . . . Tk are marked by 0.

The block period Tb may be set by the network operator, according to the desired data loss measurement rate (as it will be described in detail herein after, the block period Tb is also the measurement period). For instance, the block period Tb may be equal to 5 minutes.

When a data loss measurement is started at the node Ni (e.g. by sending a suitable command to the node Ni, which may contain the value of the block period Tb), the input interface Iin1 preferably set to 0 its global input counters X1(1), X1(0) and its partial input counters X12(1), X12(0); X13(1), X13(0); X14(1), X14(0) (step 401).

Upon reception of a packet Pk1 (step 402), the input interface Iin1 preferably checks whether the packet Pk1 is marked, for instance by reading the value of its first marking bit b1 (step 403).

If the packet Pk1 is already marked (as it will be described herein after, the packet Pk1 may be marked by a node upstream the node Ni), the input interface Iin1 preferably checks its marking by reading its second marking bit b2 (step 404). If the packet Pk1 is marked by 1 (b2=1), the input interface Iin1 preferably increases by one the global input counter X1(1) (step 405). Otherwise, if the packet Pk1 is marked by 0 (b2=0), the input interface Iin1 preferably increases by one the other global input counter X1(0) (step 405').

If at step 403 the input interface Iin1 determines that the packet Pk1 is not marked, it preferably marks it. In particular, for marking the packet Pk1, the input interface Iin1 firstly determines whether the current block period is an odd block period T1, T3, . . . Tk−1 or an even block period T2, T4, . . . Tk (step 406). If the current block period is an odd block period T1, T3, . . . Tk−1, the input interface Iin1 preferably marks the packet Pk1 by 1 by setting its second marking bit b2 to 1 (step 407). Otherwise, if the current block period is an even block period T2, T4, . . . Tk, the input interface Iin1 preferably marks the packet Pk1 by 0 by setting its second marking bit b2 to 0 (step 407'). At steps 407 and 407', the input interface Iin1 also preferably sets the first marking bit b1 to 1, for indicating that the packet Pk1 is now marked.

Then, the input interface Iin1 preferably increases the partial input counters according to the marking of the packet Pk1 and according to the output interface (namely Iout2, Iout3 or Iout4) to which the packet Pk1 has to be forwarded within the node Ni.

In particular, independently of whether the packet Pk1 was marked by the input interface Iin1 at steps 407-407' or it was received already marked at the input interface Iin1, if its marking is equal to 1 (step 408), the input interface Iin1 checks its output interface (step 409) and:
if the packet Pk1 has to be forwarded to the output interface Iout2, it increases the partial input counter X12(1) (step 410);
if the packet Pk1 has to be forwarded to the output interface Iout3, it increases the partial input counter X13(1) (step 410'); and
if the packet Pk1 has to be forwarded to the output interface Iout4, it increases the partial input counter X14(1) (step 410").

On the other hand, independently of whether the packet Pk1 was marked by the input interface Iin1 at steps 407-407' or it was received already marked at the input interface Iin1, if its marking is equal to 0 (step 408), the input interface Iin1 checks its output interface (step 411) and:
if the packet Pk1 has to be forwarded to the output interface Iout2, it increases the partial input counter X12(0) (step 412);
if the packet Pk1 has to be forwarded to the output interface Iout3, it increases the partial input counter X13(0) (step 412'); and
if the packet Pk1 has to be forwarded to the output interface Iout4, it increases the partial input counter X14(0) (step 412").

Figure 4:
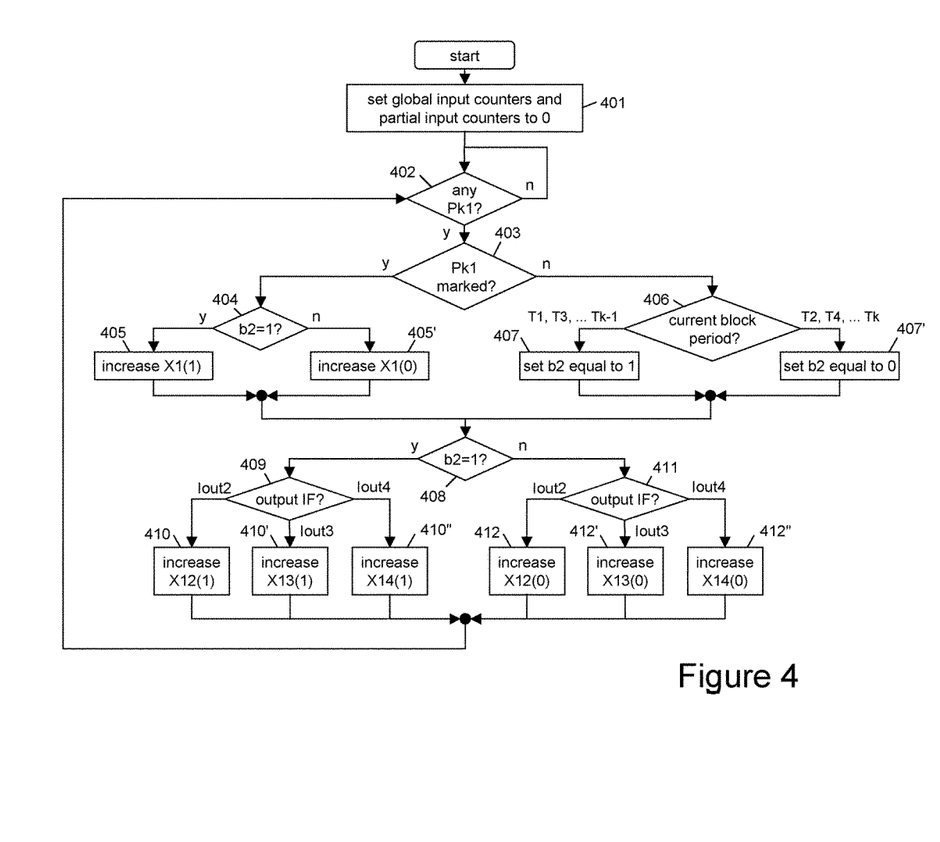
FIG. 4 is a flow chart of the operation of an input interface of the node of FIG. 3, according to a first embodiment of the present invention.

The input interface Iin1 then forwards the packet Pk1 to the relevant output interface (step not shown in FIG. 4).

If the input interface Iin1 determines that the node Ni is the destination node of the packet Pk1, the packet Pk1 is not forwarded to any output interface and none of the partial input counters is increased.

The above operations are repeated by the input interface Iin1 for every received packet Pk1. Under the assumption that the node Ni (in particular, the input interface Iin1) and the upstream node(s) which originally marked the packets which are received already marked at the node Ni are mutually synchronized (i.e. they use the same block period Tb and have synchronized local clocks which they use for determining whether the current block period is an even or odd block period), the results of the above operations is forming blocks of packets Pk1 marked by 1 and blocks of packets Pk1 marked by 0 which alternate in time, all the blocks having a same duration equal to the block period Tb.

During the odd block periods T1, T3, . . . Tk−1 the packets Pk1 are marked by 1, whereas during the even block periods T2, T4, . . . Tk the packets Pk1 are marked by 0. Besides, during the odd block periods T1, T3, . . . Tk−1 the values of the global input counter X1(1) and of the partial input counters X12(1), X13(1), X14(1) increase, while the values of the global input counter X1(0) and of the partial input counters X12(0), X13(0), X14(0) are constant. On the other hand, during the even block periods T2, T4, . . . Tk the values of the global input counter X1(0) and of the partial input counters X12(0), X13(0), X14(0) increases, while the values of the global input counter X1(1) and of the partial input counters X12(1), X13(1), X14(1) are constant.

The couple of global input counters X1(1), X1(0) counts the already marked packets Pk1 received at the input interface Iin1, whereas the (n−1)=3 couples of partial input counters X12(1), X12(0); X13(1), X13(0); X14(1), X14(0) count all the packets Pk1 transmitted within the node Ni by the input interface Iin1 according to the output interface to which they have to be transmitted.

Since the input interface In1 forwards each packet Pk1 towards an output interface, the packets Pk1 are distributed among the output interfaces Iout2, Iout3 and Iout4.

The operation of all the other input interfaces Iin2, Iin3, Iin4 is the same as the input interface Iin1. A detailed description will not therefore be repeated.

Figure 5:
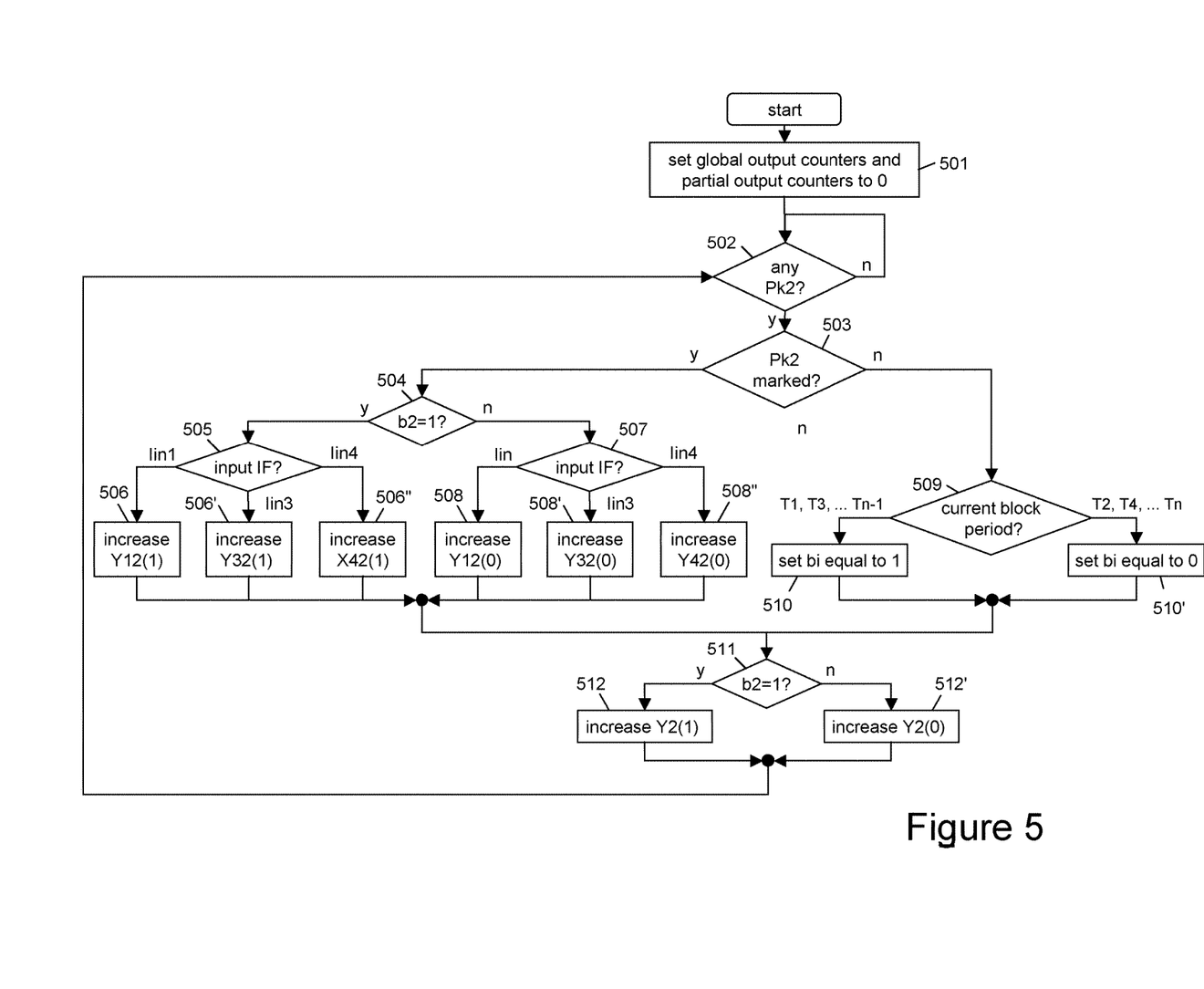
FIG. 5 is a flow chart of the operation of an output interface of the node of FIG. 3, according to a first embodiment of the present invention.

The operation of the output interface Iout2 of the port P2 according to a first embodiment of the present invention will be now described in detail with reference to FIG. 5.

The output interface Iout2 receives packets Pk2 from the input interfaces Iin1, Iin3 and Iin4 of the other ports P1, P3 and P4 and packets Pk2 originated by the node Ni itself, and merges them in a single stream of packets Pk2 which is then forwarded to a further node adjacent to the node Ni along the link exiting the output interface Iout2. The packets Pk2 may belong to different data flows which have different sources and/or destinations and whose paths from source to destination cross at least at the node Ni.

When a data loss measurement is started at the node Ni, the output interface Iout2 preferably set to 0 its global output counters Y2(1), Y2(0) and its partial output counters Y12(1), Y12(0); Y32(1), Y32(0); Y42(1), Y42(0) (step 501).

Upon reception of a packet Pk2 (step 502), the output interface Iout2 preferably checks whether the packet Pk2 is marked, for instance by reading the value of its first marking bit b1 (step 503).

If the packet Pk2 is already marked (which is the case when the packet Pk2 is received from anyone of the input interfaces Iin1, Iin3 or Iin4), the output interface Iout2 preferably checks its marking (step 504) and increases the partial output counters according to the marking of the packet Pk2 and according to the input interface (namely Iin1, Iin3 or Iin4) from which the packet Pk2 is received.

In particular, if the marking of the packet Pk2 is equal to 1, the output interface Iout2 checks its input interface (step 505) and:

if the packet Pk2 is received from the input interface Iin1, it increases the partial output counter Y12(1) (step 506);

if the packet Pk2 is received from the input interface Iin3, it increases the partial output counter Y32(1) (step 506'); and if the packet Pk2 is received from the input interface Iin4, it increases the partial output counter Y42(1) (step 506").

On the other hand, if the marking of the packet Pk2 is equal to 0, the output interface Iout2 checks its input interface (step 507) and:

if the packet Pk2 is received from the input interface Iin1, it increases the partial output counter Y12(0) (step 508);

if the packet Pk2 is received from the input interface Iin3, it increases the partial output counter Y32(0) (step 508'); and if the packet Pk2 is received from the input interface Iin4, it increases the partial output counter Y42(0) (step 508").

If at step 503 the output interface Iout2 determines that the packet Pk2 is not marked (e.g. because the packet Pk2 is generated by the node Ni itself), it preferably marks it. In particular, the output interface Iout2 marks the packet Pk2 by periodically changing the marking (1 or 0) with the above defined block period Tb.

More particularly, for marking the packet Pk2, the output interface Iout2 firstly determines whether the current block period is an odd block period T1, T3, . . . Tk−1 or an even block period T2, T4, . . . Tk (step 509). If the current block period is an odd block period T1, T3, . . . Tk−1, the output interface Iout2 preferably marks the packet Pk2 by 1 by setting its second marking bit b2 to 1 (step 510). Otherwise, if the current block period is an even block period T2, T4, . . . Tk, the output interface Iout2 preferably marks the packet Pk2 by 0 by setting its second marking bit b2 to 0 (step 510'). All the input and output interfaces of the node Ni are synchronized to a same clock (i.e. the local clock of the node Ni), and therefore the determination of the current block period performed by the output interface Iout2 at step 509 is the same as the determination performed by the input interface Iin1 at step 406. In other words, at each time instant, all the input and output interfaces apply the same marking to the packets under process.

At steps 510 and 510', the output interface Iout2 also preferably sets the first marking bit b1 to 1, thereby indicating that the packet Pk2 is now marked.

Then, independently of whether the packet Pk2 was marked by the output interface Iout2 or was received already marked at the output interface Iout2, if the packet Pk2 is marked by 1 (b2=1) (step 511), the output interface Iout2 preferably increases by one the global input counter Y2(1) (step 512). Otherwise, if the packet Pk2 is marked by 0 (b2=0) (step 511), the output interface Iout2 preferably increases by one the other global input counter Y2(0) (step 512').

The output interface Iout2 then forwards the packet Pk2 to the further adjacent node (step not shown in FIG. 5) along the exiting link.

The above operations are repeated by the output interface Iout2 for every received packet Pk2. Since, as mentioned above, all the interfaces of the node Ni are mutually synchronized (i.e. they use the same block period Tb and have synchronized clocks which they use for determining whether the current block period is an even or odd block period), the results of the above operations is forming blocks of packets Pk2 marked by 1 and blocks of packets marked by 0 which alternate in time, all the blocks having a same duration equal to the block period Tb.

During the odd block periods T1, T3, ... Tk−1 the packets Pk2 are marked by 1, whereas during the even block periods T2, T4, ... Tk the packets Pk2 are marked by 0. Besides, during the odd block periods T1, T3, ... Tk−1 the values of the global output counter Y2(1) and of the partial output counters Y12(1), Y32(1), X42(1) increase, while the values of the global output counter Y2(0) and of the partial output counters Y12(0), Y32(0), Y42(0) are constant. On the other hand, during the even block periods T2, T4, ... Tk the values of the global output counter Y2(0) and of the partial output counters Y12(0), Y32(0), Y42(0) increases, while the values of the global output counter Y2(1) and of the partial output counters Y12(1), Y32(1), Y42(1) are constant.

The (n−1)=3 couples of partial output counters Y12(1), Y12(0); Y32(1), Y32(0); Y42(1), Y42(0) count the already marked packets Pk2 received at the output interface Iout2 according to the input interface from which they are received, whereas the couple of global output counters Y2(1), Y2(0) count all the packets Pk2 transmitted by the output interface Iout2 to the further adjacent node.

The operation all the other output interfaces Iout1, Iout3, Iout4 is the same as the output interface Iout2. A detailed description will not therefore be repeated.

At each block period Tb, the node Ni then provides a set of global and partial counters which allow calculating data loss relating to data traffic crossing the node Ni, as it will be described in further detail by referring to FIGS. 6a and 6b.

Figure 6A:
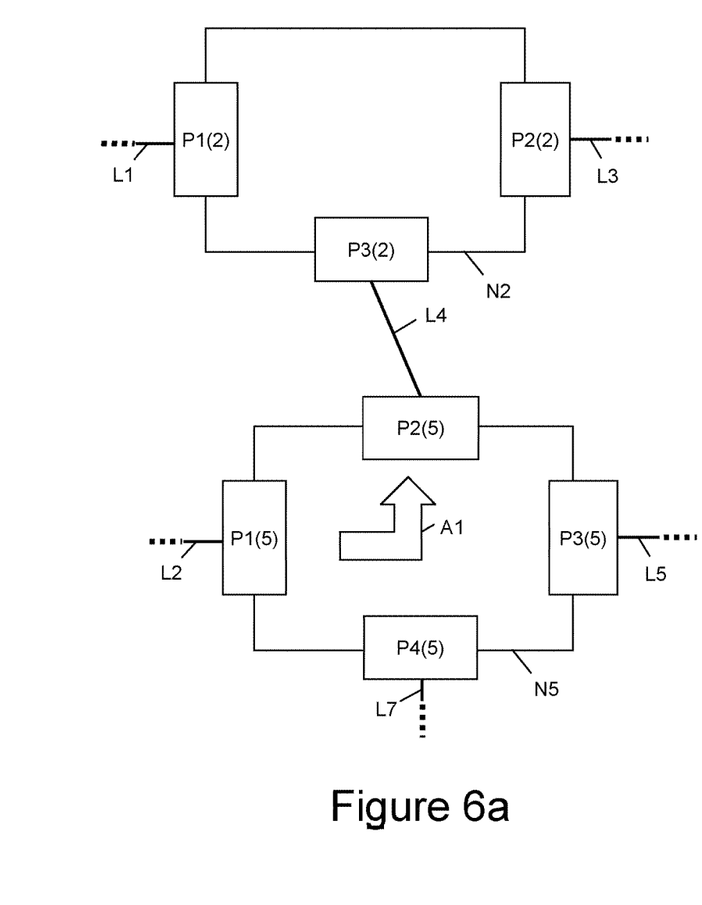
FIGS. 6a and 6b schematically shows a node measurement and a link measurement, respectively, applied to a portion of the communication network of FIG. 1.
Figure 6B:
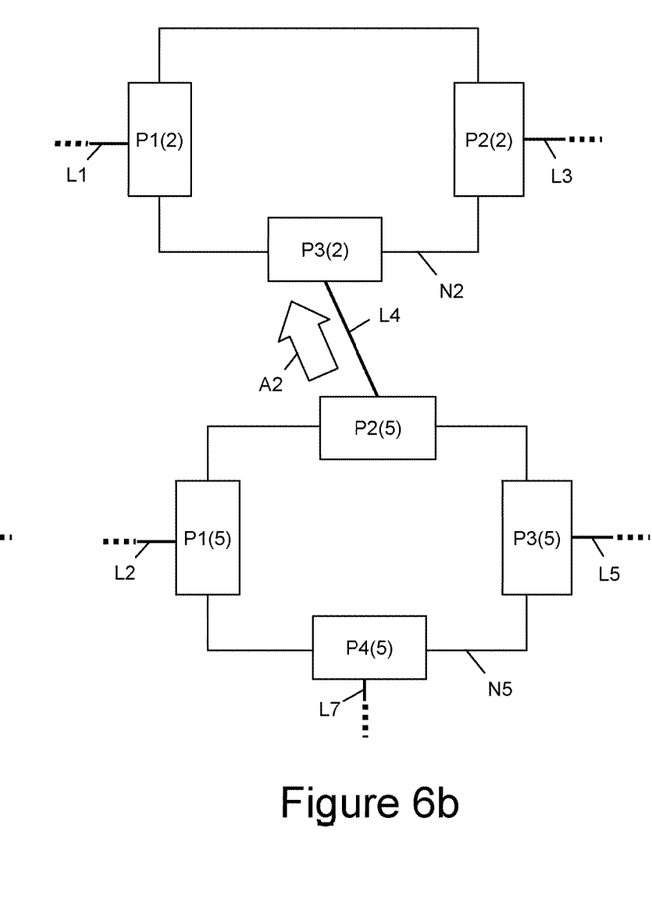

FIGS. 6a and 6b show in further detail a portion of the communication network CN of FIG. 1. In particular, FIGS. 6a and 6b show the nodes N2 and N5. The node N2 comprises three ports P1(2), P2(2), P3(2), while the node N5 comprises four ports P1(5), P2(5), P3(5), P4(5). Each port of the nodes N2 and N5 comprises an input interface and an output interface, whose operation is substantially the same as the input and output interfaces of the ports of the node Ni (see flow charts of FIGS. 4 and 5). A detailed description of the ports of the nodes N2 and N5 and their operation will therefore not be repeated.

Each port P1(2), P2(2), P3(2) of the node N2 connects the node N2 to an adjacent node of the network CN by means of a respective link. Similarly, each port P1(5), P2(5), P3(5), P4(5) of the node N5 connects the node N5 to an adjacent node of the network CN by means of a respective link. In particular, the port P2(5) of the node N5 is connected to the port P3(2) of the node N2 by the link L4. The link L4 is bidirectional and its opposite ends are physically connected to the input and output interfaces comprised in the ports P2(5) and P3(2), so that the nodes N2 and N5 may exchange bidirectional data traffic along the link L4.

At each block period Tb, two types of data loss measurements may be performed, namely node data loss measurements (see FIG. 6a) and link data loss measurements (see FIG. 6b).

A node data loss indicates the data loss affecting data traffic transmitted from the input interface of a first port of a node to the output interface of a second port of the same node. The node data loss may be calculated as the difference between:
  (i) the partial input counter provided by the input interface of the first port which counts the packets to be forwarded to the output interface of the second port, and
  (ii) the partial output counter provided by the output interface of the second port which counts the packets received from the input interface of the first port.

At each block period, the partial counters used for making the calculation are the partial counters which have constant value during the current block period (namely: during the odd block periods T1, T3, ... Tk−1 the partial counters counting 0-marked packets, and during even block periods T2, T4, ... Tk the partial counters counting 1-marked packets).

For instance, with reference to FIG. 6a, the node data loss DL12(5) of the data traffic transmitted within the node N5 from the input interface of the port P1(5) to the output interface of the port P2(5) (indicated by the arrow A1) may be calculated as:

$$DL12(5)=X12_5(0)-Y12_5(0) \text{ during the odd block periods; and}$$

$$DL12(5)=X12_5(1)-Y12_5(1) \text{ during the even block periods,}$$

where $X12_5(0)$ and $X12_5(1)$ are the partial input counters provided by the input interface of the port P1(5) which count the packets to be forwarded to the output interface of the port P2(5), while $Y12_5(0)$ and $Y12_5(1)$ are the partial output counters provided by the output interface of the port P2(5) which count the packets received from the input interface of the port P1(5).

Each node of the communication network CN may therefore perform node data loss measurements autonomously, i.e. independently of the other nodes of the communication network CN. Even if the other nodes of the communication network CN do not implement the above described method, each node may autonomously calculate the data loss between any couple of its ports, because all its input and output interfaces are provided with the marking and counting capabilities allowing it to generate the partial counters whose values are needed for calculating the node data loss.

As far as link data loss measurements are concerned, a link data loss indicates the data loss affecting data traffic transmitted from the output interface of a port of a first node to the input interface of a port of a second node over a link connecting the first and second nodes. The link data loss may be calculated as the difference between:
  (i) the global output counter provided by the output interface of the port of the first node which counts the packets to be forwarded over the link and
  (ii) the global input counter provided by the input interface of the port of the second node which counts the packets received from the link.

At each block period, the global counters used for making the calculation are the global counters which have constant value during the current block period (namely: during the odd block periods T1, T3, ... Tk−1 the global counters counting 0-marked packets, and during even block periods T2, T4, ... Tk the global counters counting 1-marked packets).

For instance, with reference to FIG. 6b, the link data loss DL(5-2) of the data traffic transmitted over the link L4 from the output interface of the port P2(5) of the node N5 to the input interface of the port P3(2) of the node N2 (indicated by the arrow A2) may be calculated as:

$$DL(5\text{-}2)=Y2_5(0)-X3_2(0) \text{ during the odd block periods; and}$$

$$DL(5\text{-}2)=Y2_5(1)-X3_2(1) \text{ during the even block periods,}$$

where $Y2_5(0)$ and $Y2_5(1)$ are the global output counters provided by the output interface of the port P2(5) which count the packets transmitted by the output interface of the port P2(5) along the link L4, while $X3_2(0)$ and $X3_2(1)$ are the global input counters provided by the input interface of the port P3(2) of the node N2 which count the packets received by the input interface of the port P3(2) along the link L4.

Hence, for performing a link data loss measurement, the global counters generated by the nodes upstream and downstream the link are needed. Therefore, the above described marking and counting capabilities shall be implemented at the nodes immediately upstream and downstream the link, and the values of the global counters shall be provided to a single entity, which is responsible for calculating the link data loss using the values of the global counters.

According to a centralized approach, the management server MS may be responsible for calculating the link data loss. In this case, at each block period the nodes of the communication network CN may send to the management server MS the values of the global counters generated by their input and output interfaces and having constant value during the current block period, so that the management server MS may use them for calculating the link data loss.

According to a distributed approach, the nodes themselves may be responsible for calculating the link data loss. For instance, the node immediately upstream a link may be responsible for calculating the data loss relating to that link. In this case, at each block period the node immediately downstream the link may send to the upstream node the values of the global counters generated by its input interface terminating the link and having constant value during the current block period, so that the upstream node may use them for calculating the link data loss. Alternatively, the node immediately downstream a link may be responsible for calculating the data loss relating to that link. Alternatively, both the nodes terminating a link at its opposite ends may calculate the data loss relating to that link. In that case, at each block period the nodes may exchange the values of the respective global counters having constant value during the current block period, so that each node may autonomously calculate the link data loss.

The node and link data loss measurements relating to nodes and links of the communication network CN may be used for estimating the data loss affecting a given data flow transmitted through the communication network CN from a given source node to a given destination node.

Figure 7:
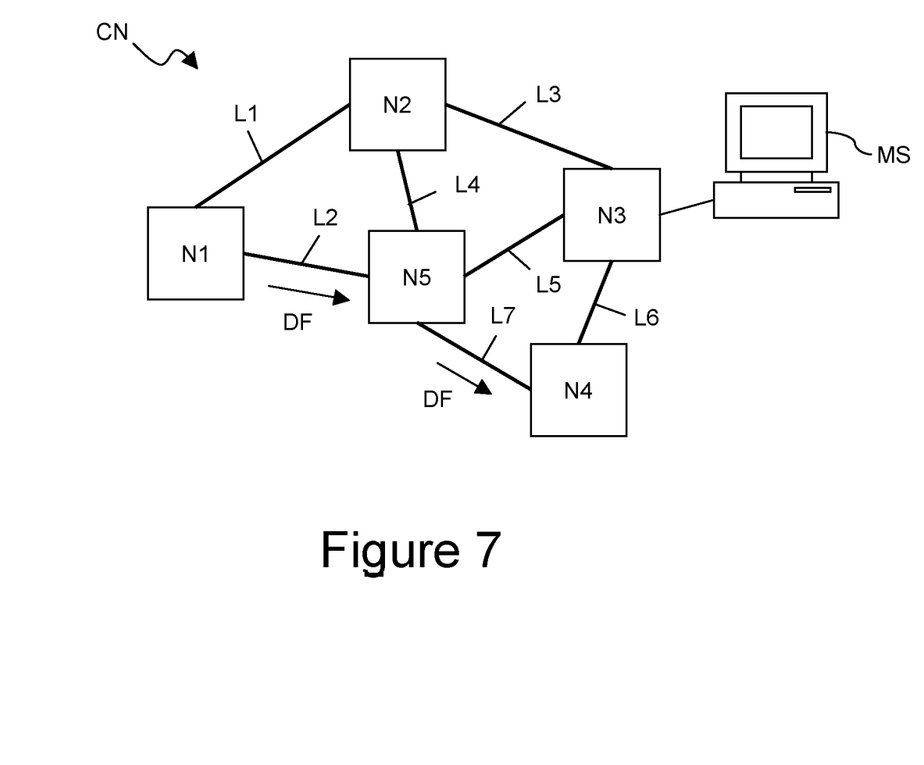
FIG. 7 schematically shows a data flow transmitted through the communication network of FIG. 1.

For instance, with reference to FIG. 7, the node and link data loss measurements relating to nodes and links of the communication network CN may be used for estimating the data loss affecting a data flow DF transmitted from N1 (acting as source node) to N4 (acting as destination node).

For performing such an estimation, the path followed by the data flow DF through the communication network CN should be known. Such path may comprise for instance: the link L2, the node N5 and the link L7.

Then, the link data loss relating to the link L2 in the direction from N1 to N5, the node data loss relating to the node N5 from the port downstream the link L2 to the port upstream the link L7 and the link data loss relating to the link L7 in the direction from N5 to N4 are calculated by the involved nodes N1, N5, N4 and/or by the management server MS using the values of the global and partial counters provided by the nodes N1, N5 and N4, as described above.

Such link and node data loss measurements basically are estimates of the data loss affecting the data flow DF over the link L2, at the node N5 and over the link L7. Such link and node data loss measurements are indeed calculated taking into account the data loss affecting not only the packets of the data flow DF, but also the packets of the other data flows whose paths at least partially overlap or cross the path of the data flow DF. For instance, the link data loss relating to the link L2 is calculated taking into account all the packets transmitted from the node N1 to the node N5 over the link L2, not only the packets of the data flow DF. Indeed, the flow charts of FIGS. 4 and 5 show that, when the input and output interfaces of a node increase their respective counters, they do not consider the data flow to which the packets belong. Therefore, the link data loss of L2 calculated as described above basically is an average of the data loss affecting all the data flows carried by the link L2 from N1 to N5. Such a link data loss measurement is accordingly a quite accurate estimate of the actual data loss affecting the data flow DF over the link L2, provided that the actual data loss affecting the data flow DF is not too far from the average.

The link and node data loss measurements relating to L2, N5 and L7 may be also added together, thereby providing an estimate of the end-to-end data loss affecting the data flow DF along its entire path.

The above described method therefore advantageously allows estimating the data loss affecting a data flow without the need to identify the data flow at each node comprised in its path through the communication network. Indeed, the nodes of the communication networks provide node data loss measurements and link data loss measurements which relate to all the traffic carried through the network, without making any distinction between the various data flows. An estimate of the data loss affecting a given data flow is derived from the node and link data loss measurements, once the path of the data flow is known.

This solution is very simple to implement at the nodes of the communication network, because each node merely has to check the marking of the packets, without having to read or process further information (for instance source or destination MAC address, VLAN-id or, in IP packets, at least one of source or destination IP address, source or destination port identifier or protocol) allowing identification of the data flows.

Further, no customisation of the packet marking and/or counting mechanisms is required at the nodes for estimating the data loss relating to a given data flow. Indeed, the link and node data loss measurements calculated based on the counters provided by the nodes as described above allow estimating the data loss for any data flow transmitted through the communication network, independently of the path followed by the data flow. The nodes may provide continuously their counters based on which the data loss performance of each node and link may be monitored. In case a new data loss estimate is needed on a given data flow, the operation of the nodes is kept unchanged and the relevant link and node data loss measurements are gathered for providing the desired estimate.

Further, the above method does not interfere with possible data loss measurement sessions carried out on specific data flows according to WO 2010/072251. Indeed, as described above with reference to FIG. 4, the input interfaces of the nodes, upon reception of an already marked packet from an adjacent node, merely increase the global input counters, without modifying the marking of the packet. Similarly, as shown in FIG. 5, the output interfaces of the nodes, upon reception of an already marked packet, merely increase the relevant partial output counters, without modifying the marking of the packet. In other words, each node merely marks unmarked packets, but do not remark already marked packets. Therefore, in case a packet is marked by its source node for implementing an end-to-end data loss measurement according to WO 2010/072251, the intermediate nodes of the path do not change such marking. The packet is accordingly received at the destination node with its original marking unchanged. The destination node may then identify such packet and suitably process it for measuring the data loss.

According to a second embodiment of the present invention, the above described method may be used for performing, in addition to a data loss measurement, also a time measurement (i.e. a delay and/or interarrival jitter measurement).

To this purpose, each input interface Iin1, Iin2, Iin3, Iin4 preferably implements, for each global and partial input counter, a respective input timestamp. Similarly, each output interface Iout1, Iout2, Iout3, Iout4 preferably implements, for each global and partial output counter, a respective output timestamp.

According to this second embodiment, after checking the marking of the received packet Pk1 (step 404 of FIG. 4), the input interface Iin1 preferably checks also whether the received packet Pk1 is the first packet received during the current block period and, in the affirmative, sets to the current time (indicated by the local clock of the node Ni) the input timestamp associated to the global input counter counting packets marked as the packet Pk1. This way, the input timestamps associated to the global input counters $X1(1)$, $X1(0)$ indicate the time at which the first packet Pk1 marked by 1 or 0 is received during the current odd or even block period.

Similarly, after checking again the marking of the packet Pk1 (step 408 of FIG. 4) and the output interface to which the packet Pk1 has to be forwarded (steps 409, 411 of FIG. 4), the input interface Iin1 preferably checks also whether the received packet Pk1 is the first packet to be transmitted to that output interface during the current block period and, in the affirmative, sets to the current time (indicated by the local clock of the node Ni) the input timestamp associated to the partial input counter relating to that output interface and counting packets marked as the packet Pk1. This way, the input timestamps associated to the partial input counters $X12(1)$, $X12(0)$; $X13(1)$, $X13(0)$; $X14(1)$, $X14(0)$ indicate the time at which the first packet Pk1 marked by 1 or 0 is forwarded to the output interfaces Iout2, Iout3 and Iout4 during the current odd or even block period.

On the other hand, according to the second embodiment, after checking the marking of the packet Pk2 (step 504 of FIG. 5) and the input interface from which the packet Pk2 is received (steps 505, 507 of FIG. 5), the output interface Iout2 preferably checks also whether the received packet Pk2 is the first packet received from that input interface during the current block period and, in the affirmative, sets to the current time (indicated by the local clock of the node Ni) the output timestamp associated to the partial output counter relating to that input interface and counting packets marked as the packet Pk2. This way, the output timestamps associated to the partial output counters $Y12(1)$, $Y12(0)$; $Y32(1)$, $Y32(0)$; $Y42(1)$, $Y42(0)$ indicate the time at which the first packet Pk2 marked by 1 or 0 is received from the input interfaces Iin1, Iin3 and Iin4 during the current odd or even block period.

Similarly, after checking again the marking of the received packet Pk2 (step 511 of FIG. 5), the output interface Iout2 preferably checks also whether the packet Pk2 is the first packet to be transmitted along the exiting link during the current block period and, in the affirmative, sets to the current time (indicated by the local clock of the node Ni) the output timestamp associated to the global output counter counting packets marked as the packet Pk2. This way, the output timestamps associated to the global output counters $Y2(1)$, $Y2(0)$ indicate the time at which the first packet Pk2 marked by 1 or 0 is transmitted during the current odd or even block period.

At each block period Tb, the node Ni then provides a set of timestamps which allow performing time (in particular, delay and/or interarrival jitter) measurements relating to data traffic crossing the node Ni. In particular, at each block period Tb, two types of time measurements may be performed, namely node time measurements and link time measurements.

A node time measurement (in particular, a node delay measurement) indicates the delay affecting data traffic transmitted from the input interface of a first port of a node to the output interface of a second port of the same node. The node delay may be calculated as the difference between
(i) the output timestamp associated to the partial output counter provided by the output interface of the second port which counts the packets received from the input interface of the first port, and
(ii) the input timestamp associated to the partial input counter provided by the input interface of the first port which counts the packets to be forwarded to the output interface of the second port.

At each block period, the timestamps used for making the calculation are the timestamps associated to the partial counters which have constant value during the current block period (namely: during the odd block periods T1, T3, . . . Tk−1 the partial counters counting 0-marked packets, and during even block periods T2, T4, . . . Tk the partial counters counting 1-marked packets).

Each node of the communication network CN may perform node delay measurements autonomously, i.e. independently of the other nodes of the communication network CN. Even if the other nodes of the communication network CN do not implement the above described method, each node may autonomously calculate the delay between any couple of its ports, because all its input and output interfaces are provided with the marking, counting and timestamping capabilities allowing it to generate the timestamps associated to the partial counters whose values are needed for calculating the node delay.

As far as link time measurements are concerned (in particular, link delay measurements), a link delay indicates the delay affecting data traffic transmitted from the output interface of a port of a first node to the input interface of a port of a second node over a link connecting the first and second nodes. The link delay may be calculated as the difference between:
(i) the input timestamp associated to the global input counter provided by the input interface of the port of the second node which counts the packets received from the link, and
(ii) the output timestamp associated to the global output counter provided by the output interface of the port of the first node which counts the packets to be forwarded over the link.

At each block period, the timestamps used for making the calculation are the timestamps associated to the global counters which have constant value during the current block period (namely: during the odd block periods T1, T3, . . . Tk−1 the global counters counting 0-marked packets, and during even block periods T2, T4, . . . Tk the global counters counting 1-marked packets).

Hence, for performing a link delay measurement, the timestamps associated to the global counters generated by the nodes upstream and downstream the link are needed. Therefore, the above described marking, counting and timestamping capabilities shall be implemented at the nodes immediately upstream and downstream the link, and the values of the global counters shall be provided according to the above described centralized approach or distributed approach to a single entity (namely, the management server MS or a node), which is responsible for calculating the link delay using the values of the timestamps associated to the global counters.

In addition to calculating node and link delays, also the node and link interarrival jitters may be calculated.

In particular, the node (or link) interarrival jitter may be calculated as the difference between the node (or link) delay calculated at the current block period and the node (or link) delay calculated at the preceding block period.

Alternatively, according to a particularly advantageous variant of the second embodiment, each input interface Iin1, Iin2, Iin3, Iin4 preferably implements, for each global and partial input counter, a respective couple of input timestamps: an end-of-preceding-block (EOPB) input timestamp and a start-of-current-block (SOCB) input timestamp. Similarly, each output interface Iout1, Iout2, Iout3, Iout4 preferably implements, for each global and partial output counter, a respective couple of output timestamps: an end-of-preceding-block (EOPB) output timestamp and a start-of-current-block (SOCB) output timestamp.

The SOCB input and output timestamps basically correspond to the input and output timestamps described above (i.e. they relate to the first packet of the current block period), whereas the EOPB input and output timestamps relate to the last packet of the block period preceding the current one.

According to this advantageous variants, the node Ni then provides two sets of timestamps:
- a set of SOCB timestamps which, at each block period, allow calculating the node or link delay relating to the first packet of the current block period, and
- a set of EOPB timestamps which, at each block period, allow calculating the node or link delay relating to the last packet of the preceding block period.

Also according to this advantageous variant, at each block period, the SOCB or EOPB timestamps used for making the calculation are the timestamps associated to the global or partial counters which have constant value during the current block period (namely: during the odd block periods T1, T3, . . . Tk−1 the counters counting 0-marked packets, and during even block periods T2, T4, . . . Tk the counters counting 1-marked packets).

According to this advantageous variant, the node (or link) interarrival jitter may be calculated as the difference between the node (or link) delay relating to the first packet of the current block period and the node (or link) delay relating to the last packet of the preceding block period. In other words, the interarrival jitter is calculated based on the delays of two consecutive packets. This allows calculating the interarrival jitter in a more precise way than using the delays relating to the first packet of two consecutive block periods. Indeed, possible drifting of the local clock, which may induce inaccuracy of the timestamps and hence of the calculated delay and interarrival jitter, has a much reduced effect in case of consecutive packets, because the time elapsing between transmission of two consecutive packets is much shorter that the time elapsing between transmission of the first packet of two consecutive block periods.

Preferably, at each block period the node or link delay and interarrival jitter are calculated only if the corresponding node or link data loss calculated during the same block period is equal to 0. Indeed, if the first (or last) packet of a block period is lost, the value assigned to the corresponding timestamp during that block period relates to a subsequent packet of that block, and not to the first one. Hence, a time measurement based on such timestamp is intrinsically inaccurate, because it is calculated as a difference between timestamps that relate to different packets.

However, if the first packet of a block period is lost during transmission within a node or over a link, this does not impair the accuracy of delay and interarrival jitter calculated during subsequent block periods. Indeed, loss of the first packet of a block period does not prevent the input and output interfaces of the nodes from recognizing the first packet of the subsequent block period, and from properly setting the timestamps for that block period. From then on, the delay and interarrival jitter calculation will be then immune from inaccuracy due to loss of the first packet in the previous block period.

The time measurements are not necessarily based on the first packets of each block period. According to further variants of the second embodiments, the timestamps may be set to the current time indicated by the local clock for a different packet of the block period. Further, for increasing the measurement period of delay and interarrival jitter without reducing the block period Tb, the timestamps may be set for more than one packet for each block (e.g. the first, the 101st, the 201st, etc.).

Also according to the second embodiment, the node time measurements and link time measurements relating to nodes and links of the communication network CN may be used for estimating the delay or interarrival jitter affecting a given data flow transmitted across the communication network CN from a given source node to a given destination node.

For instance, with reference again to FIG. 7, the node and link time measurements relating to nodes and links of the communication network CN may be used for estimating the delay and/or interarrival jitter affecting a data flow DF transmitted from N1 (acting as source node) to N4 (acting as destination node).

Once the path followed by the data flow DF through the communication network CN (i.e. link L2, node N5 and link L7) is known, the link delay and/or interarrival jitter of link L2 in the direction from N1 to N5, the node delay and/or interarrival jitter at node N5 from the port downstream the link L2 to the port upstream the link L7 and the link delay and/or interarrival jitter of link L7 in the direction from N5 to N4 are calculated by the involved nodes N1, N5, N4 and/or by the management server MS using the values of the timestamps provided by the nodes N1, N5 and N4, as described above.

Such link and node time measurements basically are estimates of the delay and/or interarrival jitter affecting the data flow DF over the link L2, at the node N5 and over the link L7. Such link and node time measurements are indeed calculated taking into account the delay affecting not only the packets of the data flow DF, but also the packets of other data flows whose paths at least partially overlap or cross the path of the data flow DF. Indeed, when the input and output interfaces of a node set their respective timestamps, they do not consider the data flow to which the packets belong. Therefore, the delay and/or interarrival jitter e.g. of the link L2 calculated as described above basically is an average of the delay and/or interarrival jitter affecting all the data flows transmitted over the link L2. Such a link time measurement is accordingly a quite accurate estimate of the actual delay and/or interarrival jitter affecting the data flow DF over the link L2, provided that the actual delay and/or interarrival jitter affecting the data flow DF is not too far from the average.

The link and node delay and/or interarrival jitter measurements relating to L2, N5 and L7 may be also added together, thereby providing an estimate of the end-to-end delay affecting the data flow DF along its entire path.

The method according to the second embodiment of the present invention basically has the same advantages as the method according to the first embodiment, namely: possibility to perform time measurements relating to a given data flow without the need to identify the data flow and without the need to customize the packet marking and/or counting and/or timestamping mechanism at the nodes, no interference with time measurement sessions carried out on specific data flows according to WO 2010/072251.

The above description of the method according to the first and second embodiments has been made under the assumption that the communication network CN supports a single communication protocol, namely Ethernet, IP, MPLS, etc. According to further embodiments, the communication network CN may support multiple communication protocols, possibly at different layers of the ISO-OSI or TCP/IP protocol suite. For instance, the communication network may support both Ethernet (Layer 2) and MPLS (intermediate between Layer 2 and Layer 3). In this case, a separate data loss or time measurement mechanism shall be implemented for each supported protocol.

The invention claimed is:

1. A method for performing a measurement on data traffic at a node of a communication network, the node including a number n>2 of bidirectional ports, each port comprising an input interface and an output interface, the input interface of each port being connected to the output interface of the other (n−1) ports, the method comprising:

at the input interface of each port, receiving first data units, including a first marking bit and a second marking bit, the first data units being addressed to the output interface of the other (n−1) ports and a) for each received first data unit, checking whether the first marking bit of the first data unit is set to a value indicating that the first data unit is marked and, in the affirmative, checking whether the second marking bit of the first data unit is set to any value selected from a first value and a second value;

b) in response to the first marking bit of the first data unit being set to the value indicating that the first data unit is marked, updating a global input parameter when the second marking bit of the first data unit is set to the first value, independently of the output interface to which the data unit is addressed; and c) when the second marking bit of the first data unit is set to the first value and when the first data unit is addressed to the output interface of one of the other (n−1) ports, updating a partial input parameter associated with that input interface and output interface;

the method further comprising, at the output interface of each port, receiving, from the (n−1) input interfaces of the other (n−1) ports, second data units including a first marking bit and a second marking bit, the second data units comprising at least part of the first data units, and d) for each received second data unit, checking whether the first marking bit of the second data unit is set to a value indicating that the second data unit is marked and, in the affirmative, checking whether the second marking bit of the second data unit is set to any value selected from the first value and the second value;

e) in response to the first marking bit of the second data unit being set to the value indicating that the second data unit is marked, when the second marking bit of the second data unit is set to the first value and when the second data unit is received from the input interface of one of the other (n−1) ports, updating a partial output parameter associated with that input interface and output interface; and f) updating a global output parameter when the second marking bit of the second data unit is set to the first value, independently of the input interface from which the second data unit is received;

the method further comprising g) performing a link measurement on the data traffic based on a difference between the global input parameter and the global output parameter and performing a node measurement on the data traffic based on a difference between the partial input parameter and the partial output parameter, wherein the link measurement and the node measurement are performed at predetermined block periods.

2. The method according to claim 1, wherein:

at b), the updating comprises increasing a global input counter upon reception of each first data unit having the second marking bit of the first data unit set to the first value;

at c), the updating comprises increasing a partial input counter upon reception of each first data unit having the second marking bit of the first data unit set to the first value and being addressed to the output interface;

at e), the updating comprises increasing a partial output counter upon reception of each second data unit having the second marking bit of the second data unit set to the first value and being received from the input interface;

at f), the updating comprises increasing a global output counter upon reception of each second data unit having the second marking bit of the second data unit set to the first value.

3. The method according to claim 1, wherein:

at b), the updating comprises setting a global input timestamp equal to a current time upon reception of a predetermined first data unit having the second marking bit of the first data unit set to the first value;

at c), the updating comprises setting a partial input timestamp equal to the current time upon reception of the predetermined first data unit, if the predetermined first data unit is addressed to the output interface;

at e), the updating comprises setting a partial output timestamp equal to the current time upon reception of a predetermined second data unit having the second marking bit of the second data unit set to the first value, if the predetermined second data unit is received from the input interface;

at f), the updating comprises setting a global output timestamp equal to the current time upon reception of the predetermined second data unit; and at g), the performing a measurement comprises performing a time measurement based on at least one of the global input timestamp, the partial input timestamp, the global output timestamp, and the partial output timestamp.

4. The method according to claim 3 wherein, at g), the performing a time measurement comprises measuring at least one of a delay and an interarrival jitter of the data traffic.

5. The method according to claim 3, wherein:
at b), the updating further comprises setting a further global input timestamp equal to a time upon which a further predetermined first data unit temporally adjacent to the predetermined first data unit has been received;
at c), the updating further comprises setting a further partial input timestamp equal to the time upon which the further predetermined first data unit has been received;
at e), the updating further comprises setting a further partial output timestamp equal to a time upon which a further predetermined second data unit temporally adjacent to the predetermined second data unit has been received;
at f), the updating further comprises setting a further global output timestamp equal to the time upon which the further predetermined second data unit has been received; and
at g), the performing a time measurement comprises measuring an interarrival jitter as a difference between:
one of: the global input timestamp, the partial input timestamp, the global output timestamp, and the partial output timestamp, respectively; and
one of: the further global input timestamp, the further partial input timestamp, the further global output timestamp, and the further partial output timestamp, respectively.

6. The method according to claim 1, wherein, at g), the performing a measurement comprises performing a measurement relating to the data traffic on a first link between the node and a first further node transmitting the first data units to the node based on the global input parameter and a further global output parameter generated by the first further node.

7. The method according to claim 1, wherein, at g), the performing a measurement comprises performing a measurement relating to the data traffic on a second link between the node and a second further node receiving the second packets from the node based on the global output parameter and a further global input parameter generated by the second further node.

8. The method according to claim 1, further comprising, if at a) it is determined that the first data unit is not marked, marking the first data unit by setting the second marking bit of the first data unit to the first value before performing c).

9. The method according to claim 1, further comprising, if at d) it is determined that the second data unit is not marked, marking the second data unit by setting the second marking bit of the second data unit to the first value before performing f).

10. The method according to claim 1, wherein g) is performed by a management server cooperating with the node.

11. The method according to claim 1, wherein g) is performed by the node.

12. A non-transitory computer readable medium, loadable in the memory of at least one computer and including software code portions for performing the method of claim 1.

13. The method according to claim 1, wherein:
at b), the updating comprises increasing a first global input counter upon reception of each first data unit having the second marking bit of the first data unit set to the first value and increasing a second global input counter upon reception of each first data unit having the second marking bit of the first data unit set to the second value.

14. The method according to claim 1, wherein:
at f), the updating comprises increasing a first global output counter when the second marking bit of the second data unit is set to the first value, and increasing a second global output counter when the second marking bit of the second data unit is set to the second value.

15. The method according to claim 1, wherein:
each input interface is associated with two global input counters and (n−1) pairs of partial input counters, and
each output interface is associated with two global output counters and (n−1) pairs of partial output counters.

16. The method according to claim 1, wherein a value of the second marking bit of the first data unit and a value of the second marking bit of the second data unit correspond to a block period, wherein during an odd block period, the value is set to the first value and during an even block period, the value is set to the second value, and wherein the block period is synchronized between the node and at least one other node.

17. The method according to claim 16, wherein at each instance of marking, the synchronized node and the at least one other node both apply the same value marked feature corresponding to the block period.

18. A node for a communication network, the node comprising:
a number n>2 of bidirectional ports, each port comprising an input interface and an output interface, the input interface of each port being connected to the output interface of the other (n−1) ports,
wherein the input interface of each port is configured to receive first data units, including a first marking bit and a second marking bit, the first data units being addressed to the output interfaces of the other (n−1) ports and is further configured to
a) for each received first data unit, check whether the first marking bit of the first data unit is set to a value indicating that the first data unit is marked and, in the affirmative, check whether the second marking bit of the first data unit is set to any value selected from a first value and a second value,
b) in response to the first marking bit of the first data unit being set to the value indicating that the first data unit is marked, update a global input parameter when the second marking bit of the first data unit is set to the first value, independently of the output interface to which the data unit is addressed, and
c) when the second marking bit of the first data unit is set to the first value and when the first data unit is addressed to the output interface of one of the other (n−1) ports, update a partial input parameter associated with that input interface and output interface,
wherein the output interface of each port is configured to receive from the (n−1) input interfaces of the other (n−1) ports second data units including a first marking bit and a second marking bit, the second data units comprising at least part of the first data units, and is further configured to
d) for each received second data unit, check whether the first marking bit of the second data unit is set to a value indicating that the second data unit is marked and, in the affirmative, check whether the second marking bit of the second data unit is set to any value selected from the first value and the second value, e) in response to the first marking bit of the second data unit being set to the value indicating that the second data unit is marked, when the second marking bit of the second data unit is set to the first value and when the second data unit is received from the input interface of one of the other (n−1) ports, update a partial output parameter associated with that input interface and output interface, f) update the global output parameter when the second marking bit of the second data unit is set to the first value independently of the input interface from which the second data unit is received, the node being configured to provide the global input parameter, the partial input parameter, the global output parameter, and the partial output parameter for performing a measurement on the data traffic, and is further configured to g) perform a link measurement on the data traffic based on a difference between the global input parameter and the global output parameter and perform a node measurement on the data traffic based on a difference between the partial input parameter and the partial output parameter, wherein the link measurement and the node measurement are performed at predetermined block periods.

19. A management server for a communication network, the management server being configured to cooperated with the node according to claim 18, the management server being configured to perform a measurement on the data traffic based on at least one of the global input parameter, the partial input parameter, the global output parameter, and the partial output parameter.

* * * * *